Aug. 28, 1956 W. H. COULTER Re. 24,204

AMPLIFIER CIRCUIT HAVING SERIES-CONNECTED TUBES

Original Filed March 21, 1949

Inventor
Wallace H. Coulter
By Silverman + Mullin
attorneys

United States Patent Office

Re. 24,204
Reissued Aug. 28, 1956

24,204

AMPLIFIER CIRCUIT HAVING SERIES-CONNECTED TUBES

Wallace H. Coulter, Chicago, Ill.

Original No. 2,659,775, dated November 17, 1953, Serial No. 82,677, March 21, 1949. Application for reissue June 15, 1955, Serial No. 515,802

13 Claims. (Cl. 179—171)

Matter enclosed in heavy brackets [ ] appears in the original patent but forms no part of this reissue specification; matter printed in italics indicates the additions made by reissue.

This invention relates to a new amplifier circuit having series-connected tubes. A valuable feature of the circuit is its ability to feed more power into low impedance loads than generally obtainable heretofore with prior art vacuum tube circuits.

A problem frequently encountered in electronic circuit design is the transfer of power from the output circuits of vacuum tubes which are of relatively high impedance to loads of relatively low impedance. Vacuum tubes, in comparison to low impedance loads of a few hundred ohms or less, are relatively high impedance devices.

The circuit is particularly suited for the output of audio frequency amplifiers where its ability to feed low impedance loads makes practical a direct connection to dynamic loud speaker voice coils without requiring the use of an intervening impedance matching transformer as commonly employed.

Vacuum tubes have an output impedance of the order of several hundred ohms at least and for many types the impedance is much higher. By contrast a loud speaker of the dynamic type will generally have an input impedance of from 3 to 16 ohms. Such devices may be made to have an impedance of 100 or 200 ohms or even higher but such range of value generally represents the maximum impedance which can be economically built into such a device.

Numerous attempts have been made to devise means for coupling a speaker load directly to an amplifier without the use of such impedance matching devices as transformers. This invention provides a circuit wherein direct coupling between the amplifier and a low impedance load is practical without serious mismatch. A circuit embodying the present invention is simple and may be put into an amplifier without incurring substantial expense. A system embodying the present invention provides an amplifier having a low output impedance of the same order as the impedance in such a device as a loud speaker for example.

The invention, in general, contemplates two vacuum tubes in series as far as space current is concerned. The load is connected between the junction of the two tubes and a point maintained at a suitable potential. Each tube may, of course, be replaced by several tubes in parallel. The two series connected tubes may be similar or not, depending upon desired operating characteristics. A particularly simple system results from the use of two similar tubes and operating them similarly so that their respective power outputs are equal. Input signals to the two tubes are fed in opposed phase through the medium of a phase inverter such as a prior stage. In other words a single ended input will have a signal feeding one tube of the series pair, the other being fed through the phase inverter. In order to have the signal across each of the tubes directly proportional to the desired relative power output, degeneration in one of the series pair must be compensated for. The tube which has its cathode connected to the plate of the other tube acts like a cathode follower and is inherently degenerative. Suitable feedback is obtained from the load circuit and effectively applied to the phase inversion stage to compensate for this degeneration, and for example, in the case of identical series connected tubes, renders the outputs substantially equal to provide in effect a balanced output. The one tube may be supplied with positive feedback, or in the alternative the other tube may be supplied with negative feedback.

In accordance with the patent laws, preferred embodiments of the invention have been illustrated in the accompanying drawing and described in detail in the specification which follows. In addition certain prior structures have been illustrated and described in order to render more lucid the description of the invention and to explain the theory of operation thereof.

Figure 1:
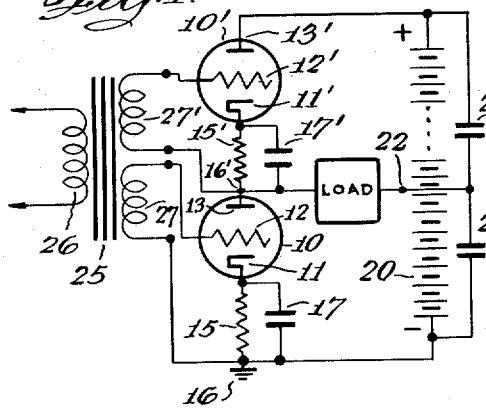
Fig. 1 is a circuit diagram of an amplifier of known construction, utilizing a series connected output pair of tubes each giving substantially equal output to a load without use of an output transformer, but in which the input is obtained through the use of a transformer having phase opposed secondaries.

Referring first to Figure 1, vacuum tube 10 has cathode 11, control grid 12 and anode 13. Cathode 11 is connected through bias resistor 15 to junction 16. Condenser 17 may be connected across bias resistor 15 to provide a low impedance path for alternating current.

Vacuum tube 10' has cathode, control grid and anode correspondingly numbered with primed numbers. Cathode 11' is connected to junction 16' through bias resistor 15'. Shunting bias resistor 16' is condenser 17'. Anode 13 of tube 10 is connected to junction 16'. Between junction 16 and anode 13' is connected power source 20 of any suitable type. This power source may be rectified alternating current with or without the usual filtering means or may be batteries or other suitable means but must provide a low impedance by-pass for signal frequencies. This may be obtained by condensers 21a and 21b. The batteries are shown merely for convenience. As is clearly indicated in the drawing, the positive terminal of power source 20 is connected to anode 13' while the negative of the power source is connected to junction 16.

It is preferred to have tubes 10 and 10' substantially identical as far as peak current characteristics are concerned. Power supply 20 has point 22 whose potential is half-way between the extreme positive and negative terminals of the entire power supply for the condition that tubes 10 and 10' are matched. Where dissimilar tubes are used, the location of tap 22 will be correspondingly moved. Between terminal 22 and junction 16' load 23 may be connected.

Input signals 180° out of phase are fed to control grids 12 and 12' of the two tubes. As shown in the drawing, a transformer is used. Transformer 25 has primary 26 supplied with signals from a suitable source. Transformer 25 has secondaries 27 and 27' connected between junctions 16 and 16' respectively on the one hand, and control grids 12 and 12' respectively on the other hand. The polarity of connections is such that the signals are 180° out of phase exactly as in a conventional push-pull system.

The relative amplitudes of the input signals to tubes 10 and 10' will be proportional to operating requirements. Thus in case tubes 10 and 10' are similar and operated similarly, the signal amplitudes will be equal. Where dissimilar tubes are used, the input amplitudes will depend upon the operating characteristics of the tubes. In this regard, the location of tap 22 will be one of the factors governing the tube operation.

The output circuit for direct current may be considered as going from the negative terminal of power supply 20 to junction 16, through the bias resistor and vacuum tube 10 to junction 16', through bias resistor 15' and then through vacuum tube 10' to the positive terminal of power supply 20 and then down through the power supply to the negative terminal. Assuming that no signal is present upon the control grids of the two tubes, it will be clear that there should be no difference in potential between junction 16' and terminal 22. Thus no current will flow through load 23. Now assuming that a signal is applied and that control grid 12' becomes more positive while control grid 12 becomes more negative, the current through tube 10' will increase while the current through tube 10 will decrease. It will thus be evident that the balanced bridge relationship normally existing is destroyed as far as the signal frequency is concerned and a difference in potential across the load is created. Thus as the currents through the two tubes vary in opposite senses, the bridge will become unbalanced first in one direction, and then in the reverse direction to result in currents flowing through the load first in one direction and then in the other direction.

It will be noted windings 27 and 27' are electrically isolated from each other. Thus the signal amplitudes at the two grids are measured with respect to the respective cathodes. No degeneration will therefore occur in top tube 10'.

As far as the load is concerned, tubes 10 and 10' are in parallel so that the impedance faced by load 23 will be one-fourth of the impedance faced by the load if the two tubes are similar and in normal push-pull relation. It should also be observed that even harmonics are balanced out in this circuit in substantially the same manner as in a conventional push-pull system.

In connection with the system shown in Figure 1, if load 23 provides a direct current path through it, then tubes 10 and 10' may be operated in any manner desired. If, however, load 23 is capacitive in character and does not provide a direct current path, then tubes 10 and 10' should preferably be operated as class A amplifiers, with space current passing through at all times. Even if tubes 10 and 10' are cut off, load 23 would supply space current for part of a cycle but distortion might result.

As thus far described, the amplifier is known in the art, but the input as heretofore used has always included a transformer giving rise to problems of weight, expanse, and frequency response. A single ended input using a phase inversion stage has not been substituted for the transformer input because such an input without the construction hereinafter described destroys the signal symmetry of the inputs to the tubes of the series connected pair preventing substantially equal, or effectively balanced output. The tube 10' in such a case would act exactly as a cathode follower and would be degenerative.

As stated above, and as described hereinafter in connection with Figs. 4 and 5, I am enabled to use a series connected pair, obtaining equal outputs with a single ended input, by compensating for the degeneration produced in the tube 10' through the use of a feedback connection extending from the load to the phase inverter stage. This comprises the invention herein and it includes supplying positive feedback to the top tube for neutralizing the degeneration therein or supplying negative feedback to the bottom tube to compensate for the degeneration in the top tube.

Figure 2:
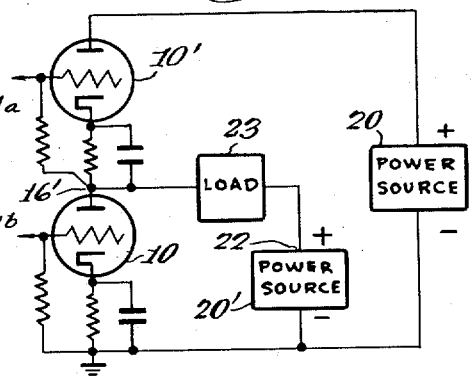
Figs. 2 and 3 illustrate various types of output circuits for use with the amplifier of Fig. 1 but which are likewise capable of being used with the invention.
Figure 3:
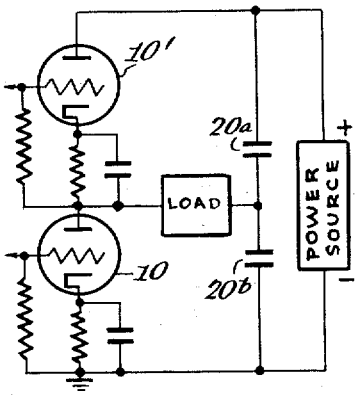

Various types of output circuits may be utilized with the invention as well as with the prior amplifier illustrated in Fig. 1 to achieve salutary results. In Figs. 2 and 3 the feedback connection is not illustrated in the output circuits to emphasize that the circuits are dependent only upon substantially equal outputs of the series connected pair and hence may be used with a transformer input amplifier.

Referring now to Figure 2, load 23 is connected between junction 16' and junction 22'. Between junction 22' and the negative terminal of power supply 20 is connected power supply 20'. Power supply 20' has a potential at its terminals one-half the potential existing across power supply 20 assuming the tubes to be similar. The positive terminal of power supply 20' will be connected to junction 22'.

Referring to Figure 3, power supply 20' is replaced by condenser 20b, connected in series with the load across tube 10. It is possible to connect condenser 20a in series with 20b, the two condensers being disposed across power supply 20'. Condensers 20a and 20b should have low impedance for any signal frequencies and preferably should each have an impedance less than the impedance of the load. It is possible to omit either of condensers 20a and 20b. The condenser arrangement may be so arranged as to provide for proper division of anode potentials.

In all the circuits shown, it is desirable that the power supply have a low impedance for the lowest signal frequency and in general this may be accomplished by having a condenser bypass the entire power supply. In the case of Figure 3, the use of two condensers will make it generally unnecessary to have a by-pass for the power supply.

As has been pointed out, load 23 in Figure 1 and the corresponding loads in Figures 2 and 3 may be a resistor or inductor. If the latter is used, the load may consist of the primary of a transformer or may be a choke for coupling purposes. Thus as in example, load 23 may be used with advantage in coupling to the mixer stage of a transmitter. Instead of expensive huge transformers a comparatively low cost inductance may be used. The load may be capacitive if desired.

For simplicity, the tubes shown are of the three electrode type. However, vacum tubes having four or five electrodes may be used. The additional electrodes may be connected in the usual manner to maintain the same at desired potentials, such connections usually involving potential dividers and by-pass condensers. In addition, the customary inverse feed back circuits for correcting frequency distortion in audio frequency amplifiers may also be utilized.

Figure 5:
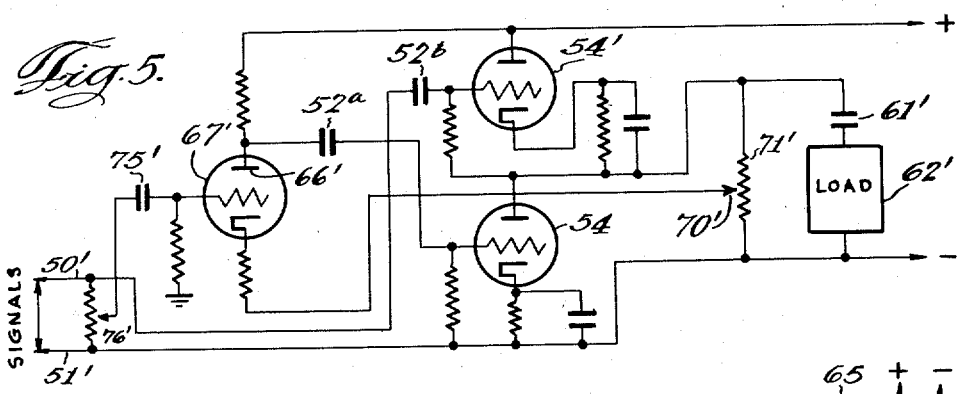
Figs. 4 and 5 are circuit diagrams of the preferred embodiments of the invention characterized, among other things, by single ended inputs and feedback to compensate for degeneration in the top tubes of the series connected pairs there illustrated.
Figure 4:
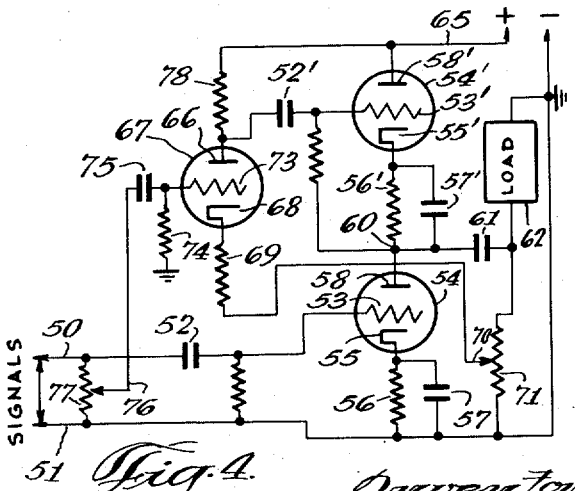

In Figures 4 and 5 there are illustrated circuits embodying the invention wherein the input to the amplifier is single ended, that is to say, consists of a simple two conductor signal channel. The signal is fed on the one hand to one tube of the series connected pair and is also simultaneously inverted by a phase inverter stage and fed to the other tube of the pair. Thus the two tubes each receive the same signal but of opposite phase. Any of the outputs of Figs. 2, 3, 4 or 5 may be used with such amplifier circuits, but since the top input circuit includes the load (usually with a grounded circuit for the top tube) there will be a lack of symmetry. Thus the potential of the top grid to ground is substantially higher than that of the bottom grid to ground by the amount across the load. The net result will be degeneration in the upper or top tube, similar to that in a cathode follower. In Figures 2 and 3, if the load is of the constant impedance type, a predetermined fixed signal ratio to the top and bottom tubes may be provided for obtaining substantially equal power outputs. However, for variable impedance loads, it will be necessary to provide for variable ratio inputs. Thus one system having such variable ratio inputs is shown in Figure 4.

Referring, therefore, to Figure 4, lines 50 and 51 may be a source of signals. For convenience, line 51 is grounded. Line 50 feeds signals through blocking condenser 52 to control grid 53 of amplifier 54. Cathode 55 is connected to grounded line 51 through bias resistor 56 shunted by by-pass condenser 57. Anode 58 is connected to junction 60. Between junction 60 and ground are connected blocking condenser 61 and load 62. Load 62 in this instance preferably provides a direct current path and may be the voice coil winding of a dynamic speaker. From junction 60, bias resistor 56' shunted by condenser 57' goes to tube 54'. The connections of the various electrodes in tube 54' are generally similar to tube 54, anode 58' being connected to line 65. Grid 53' is connected through blocking condenser 52' to anode 66 of phase inverter 67. Tube 67 has cathode 68 connected through resistor 69 to potentiometer wiper 70 operating on resistor 71 shunted across load 62. Resistor 71 is large in comparison to the impedance of load 62. Control grid 73 of phase inverter 67 is connected to ground by grid resistor 74 and is also connected through blocking condenser 75 to potentiometer wiper 76 cooperating with resistor 77 connected across the signal channel 50 and 51. Anode 66 is connected to line 65 by means of dropping resistor 78. Between lines 65 and 51, a suitable source of high potential is connected for supplying space current to the various tubes.

Through suitable adjustment of wiper 70 an exact cancellation of the degenerative effect on tube 54' due to any signal voltage appearing across load 62 may be effected. When wiper 76 of resistor 77 and wiper 70 of resistor 71 are properly adjusted an identical net signal voltage, which is desired for similar tubes, will appear between the grid and cathode of tubes 54 and 54' irrespective of load impedance changes or extraneous voltage components introduced into the load by tubes 54 and 54'.

In the system shown in Figure 4, degeneration at top tube 54' is neutralized by feed back to this tube. It is possible to provide for degenerative effects at the bottom in Figure 5 wherein the circuit is generally similar to Figure 4 except for the following: anode 66' is connected through coupling condenser 52a to the input circuit of lower tube 54. It will be noted that line 50' of the signal channel is connected through coupling condenser 52b to the input circuit of upper tube 54'. Wiper 76' is connected through coupling condenser 75' to the input of inverter tube 67'. Thus degeneration normally present in the top tube will also be induced in the bottom tube to an equal degree, assuming that proper adjustments are made. In Figure 5, feed back resistor 71' is across both blocking condenser 61' and load 62' whereas in Figure 4, the corresponding resistor is in shunt to the load only.

Grid resistors for completing the grid circuits are shown in various figures. Cathode bias resistors are also shown. However, other means for insuring desired grid bias may be utilized. In certain instances no grid bias may be necessary.

The various circuits illustrated are useful in various classes of amplifiers. Thus, Figure 3 may be used in class AB amplifiers even though, at first glance, it may appear to be unsuitable.

The use of the word "tube" throughout the specification and claims herein is not intended by way of limitation to any mechanical or geometrical structure, but rather is intended as an explanatory appellation of the electronic amplifying valve structure in the range of equivalents as understood in the art.

What is claimed is:

1. An amplifier having a first tube and a second tube, each tube having at least a plate, a grid, and a cathode, the cathode of the first tube being connected to the plate of the second tube at a common point, a source of D. C. plate potential connected across the tubes from the plate of the first tube to the cathode of the second tube, said cathode of the second tube being at signal ground potential, a load connected between said common point and ground, a signal input source, a phase inverter comprising a third tube having at least a plate, a grid and a cathode, said input source being connected to the grid of the said third tube, the plate of the third tube being connected to the grid of one of said first and second tubes, the input source also being connected to the grid of the other of said first and second tubes, a feedback path connected from a potential point of the load connection of said amplifier to the cathode circuit of the inverter whereby to apply a feedback potential thereto and cause the inverter to drive said one tube with a signal derived from said feedback path in addition to the signal input source to compensate for degeneration inherent in said first tube and produce substantially equal output of the said first and second tubes of said amplifier.

2. An amplifier as described in claim 1 in which the said one tube is the first tube and the said other tube is the second tube and the feedback signal derived from the amplifier output is positive in character.

3. An amplifier as described in claim 1 in which the said one tube is the second tube and the said other tube is the first tube, and the feedback signal derived from the amplifier output is negative in character.

4. An amplifier having a first tube and a second tube, each tube having at least a plate, a grid, and a cathode, the cathode of the first tube being connected to the plate of the second tube at a common point having an output signal potential, a source of D. C. plate potential connected across the tubes from the plate of the first tube to the cathode of the second tube, said cathode of the second tube being at signal ground potential, a load connected between said common point and ground, a signal input source, a phase inverter comprising a third tube having electrodes including at least a plate, a grid and a cathode, said input source being connected to the grid of the phase inverter and the grid of one of said first and second tubes, the plate of the phase inverter being connected to the other of said first and second tubes to feed an inverted signal thereto, a feedback path connected from a potential point of the load connection of said amplifier to one of said electrodes of said third tube excluding the grid thereof and supplying potential for raising the potential of the plate of said third tube substantially to the potential of said common point, whereby to apply a feedback signal to said inverter to drive said one tube with a signal derived from said feedback path in addition to the signal derived from said signal input source to compensate for degeneration inherent in said first tube.

5. An amplifier as described in claim 4 in which the electrode to which the feedback path is connected comprises the cathode of said third tube.

6. An amplifier as described in claim 4 in which said one tube is the first tube and said other tube is the second tube, and the feedback signal is positive in character.

7. An amplifier as described in claim 5 in which said one tube is the second tube and said other tube is the first tube and the feedback signal is negative in character.

8. An amplifier having a first tube, second tube, and third tube, each tube having at least a grid, cathode and plate, the cathode of the first tube and plate of the second tube being joined to provide a common A. C. point and a source of D. C. plate potential connected across the tubes from plate of first tube to cathode of second tube, said cathode of the second tube being at signal ground potential and the first and second tubes thereby comprising a series connected pair, a load coupled between the common point and ground to be driven by the output of the amplifier, said third tube comprising a signal inverter stage, a signal input source, a first connection extending from the signal input source through the inverter stage to the grid of the said first tube and feeding a signal to the grid of the first tube with respect to ground thereby causing a voltage to appear across the load to ground which is in negative feedback relation to the applied signal insofar as the grid-cathode circuit of said first tube is concerned, a second connection extending from said signal input source to the grid of the second tube and feeding same a signal with respect to ground in phase opposition to the signal applied to the said first tube grid, a feedback path from the common A. C. point to the said third tube for introducing a positive feedback signal which augments the amplitude of the said signal applied to said first tube so that said negative feedback affecting said first tube is opposed.

*9. An amplifier circuit for driving a load, said circuit including a pair of series-connected tubes for providing substantially balanced output for said load, the tubes each having at least a cathode, grid and plate, the cathode of the first tube and plate of the second tube being joined at least signal-wise and forming thereby a load-connecting juncture, the load adapted to be connected between said juncture and ground, the cathode of said second tube being connected signalwise to ground, there being a potential source connected between the plate of the said first tube and the cathode of the second tube, an input stage for receiving an incoming signal relative to ground and applying a voltage derived therefrom to the grid of one of said first and second tubes, and including a third tube having at least a cathode, a grid, and a plate, with the plate of said third tube being connected to the grid of said one of said first and second tubes, the signal being applied to the grid-cathode-circuit of said third tube, means for applying a second voltage derived from the incoming signal to the grid of the other of said first and second tubes, a feedback path connected from a potential point of the load connection of the amplifier to one of the electrodes of the said third tube excluding the grid thereof whereby to apply a feedback signal to said third tube to drive said one of said first and second tubes with a signal derived from said feedback path in addition to the voltage derived from said incoming signal to compensate for degeneration inherent in said first tube, the voltages derived from said incoming signal and applied to said first and second tubes being substantially of equal amplitude and opposite phase.*

*10. An amplifier circuit as described in claim 9 in which the said one of said first and second tubes is the first tube and said other of said first and second tubes is said second tube and the feedback signal is positive in character.*

*11. A amplifier circuit as described in claim 9 in which the said one of said first and second tubes is the second tube and said other of said first and second tubes is said first tube and the feedback signal is negative in character.*

*12. An amplifier circuit for driving a load, said circuit including a pair of series-connected tubes for providing substantially balanced output for said load, the tubes each having at least a cathode, grid and plate, the cathode of the first tube and plate of the second tube being joined at least signal-wise and forming thereby a load connecting juncture, the load adapted to be connected between said juncture and ground, the cathode of said second tube being connected signalwise to ground, there being a potential source connected between the plate of said first tube and cathode of said second tube, an input stage for receiving energy from a prior source and including an input potential above ground, an inter-stage connection between the input stage and the grid of one of said first and second tubes for applying a first signal to said grid of said one tube derived from said input potential, means including a connection to the grid of the other of said first and second tubes for applying a second signal to said grid of said other tube also derived from said input potential, said input stage including a third tube having at least a cathode, grid and plate with the said plate being connected to said grid of the said one tube to provide said interstage connection, means for applying a load sensing voltage to the grid of said one tube in addition to said first signal for altering said first signal substantially by the amount of said load-sensing voltage, which comprises a connection between the load and an electrode of said third tube excluding the grid, the first and second signals being substantially of equal amplitude and opposite phase.*

*13. An amplifier circuit for driving a load, said circuit including a pair of series-connected tubes for providing substantially balanced output for said load, the tubes each having at least a cathode, grid and plate, the cathode of the first tube and plate of the second tube being joined at least signal-wise and forming thereby a load-connecting juncture, the load adapted to be connected between said juncture and ground, the cathode of said second tube being connected signalwise to ground, there being a potential source connected between the plate of the said first tube and the cathode of the second tube, an input stage for receiving an incoming signal relative to ground and applying a voltage derived therefrom to the grid of one of said first and second tubes, and including a third tube having at least a cathode, a grid, and a plate, with the plate of said third tube being connected to the grid of said one tube, the signal being applied to the cathode-grid circuit of said third tube, means for applying a second voltage derived from the incoming signal to the grid of the other of said first and second tubes, and means for applying a load sensing voltage to the grid of said one tube for driving the same with said load sensing voltage in addition to the voltage derived from said incoming signal, the derived voltages applied to said first and second tubes being substantially of equal amplitude and opposite phase, said last means comprising a feedback path connected from a potential point of the load connection to one of the electrodes of said third tube excluding the grid for adding a feedback signal to the potential of the plate of said third tube to compensate for degeneration inherent in the top tube.*

References Cited in the file of this patent or the original patent

UNITED STATES PATENTS

| | | |
|---|---|---|
| 1,654,075 | Gorton | Dec. 27, 1927 |
| 1,985,923 | Gutmann | Jan. 1, 1935 |
| 2,153,756 | Hunt | Apr. 11, 1939 |
| 2,156,659 | Urtel | May 2, 1939 |
| 2,358,428 | White | Sept. 19, 1944 |
| 2,379,168 | McClellan | June 26, 1945 |
| 2,386,892 | Hadfield | Oct. 16, 1945 |
| 2,431,973 | White | Dec. 2, 1947 |
| 2,488,567 | Stodola | Nov. 22, 1949 |
| 2,510,683 | Carpentier | June 6, 1950 |
| 2,525,632 | Anderson | Oct. 10, 1950 |
| 2,594,436 | Hornfeck | Apr. 29, 1952 |